United States Patent [19]

Droege

[11] Patent Number: 4,888,673
[45] Date of Patent: Dec. 19, 1989

[54] HIGH VOLTAGE DC POWER SUPPLY

[75] Inventor: Thomas F. Droege, Batavia, Ill.

[73] Assignee: Universities Research Association Inc., Batavia, Ill.

[21] Appl. No.: 175,097

[22] Filed: Mar. 30, 1988

[51] Int. Cl.$^4$ .......................................... H02M 3/335
[52] U.S. Cl. ......................................... 363/21; 363/59
[58] Field of Search ...................... 363/20, 21, 59, 79, 363/80, 97

[56] References Cited

U.S. PATENT DOCUMENTS

| | | | |
|---|---|---|---|
| 3,533,010 | 10/1970 | Bowles | 363/59 X |
| 3,573,595 | 4/1971 | Galluppi | 363/59 X |
| 4,000,443 | 12/1976 | Lever | 363/59 X |
| 4,037,271 | 7/1977 | Keller | 363/21 |
| 4,056,734 | 11/1977 | Peterson | 363/21 X |
| 4,106,084 | 8/1978 | Gibert | 363/21 |
| 4,326,245 | 4/1982 | Saleh | 363/79 |
| 4,546,421 | 10/1985 | Bello et al. | 323/288 X |
| 4,731,720 | 3/1988 | Takahashi | 363/21 |
| 4,737,897 | 4/1988 | Shipley et al. | 363/19 |

OTHER PUBLICATIONS

Droege et al., "A Compact Modular High Voltage System for Phototube and MWPC Applications", 10/81, IEEE Transaction on Nuclear Science.

*Primary Examiner*—Patrick R. Salce
*Assistant Examiner*—Kristine Peckman
*Attorney, Agent, or Firm*—Neuman, Williams, Anderson & Olson

[57] ABSTRACT

A high voltage DC power supply having a first series resistor at the output for limiting current in the event of a short-circuited output, a second series resistor for sensing the magnitude of output current, and a voltage divider circuit for providing a source of feedback voltage for use in voltage regulation is disclosed. The voltage divider circuit is coupled to the second series resistor so as to compensate the feedback voltage for a voltage drop across the first series resistor. The power supply also includes a pulse-width modulated control circuit, having dual clock signals, which is responsive to both the feedback voltage and a command voltage, and also includes voltage and current measuring circuits responsive to the feedback voltage and the voltage developed across the second series resistor respectively.

7 Claims, 5 Drawing Sheets

HIGH VOLTAGE DC POWER SUPPLY

This invention was made with Government support under Contract No. DE-AC02-76CH03000 awarded by the U.S. Department of Energy. The Government has certain rights in the invention.

BACKGROUND OF THE INVENTION

The present invention relates generally to high voltage DC power supplies. More particularly, the present invention relates to a high voltage DC power supply for use in high energy physics applications such as with multiwire proportional chambers. The present invention provides an improved modular power supply for such high energy physics applications.

Multiwire proportional chambers are used in the field of high energy physics research to detect the position of charged, high energy particles such as protons and electrons. Typically, such charged particles, after having been accelerated to great speed by an accelerator, for example, are directed into a chamber. The chamber has a large number of fine wires passing through it, such wires having a high voltage provided by a suitable power supply. When a charged particle passes nearby a wire, it draws current from the power supply. The current drawn in this manner is measured and is used to detect the position of the particle.

Each particle detection chamber may require several power supplies, and quite often, a single high energy physics experiment may require the use of a large number of chambers and associated multiple power supplies. For this reason, the size and the cost of each power supply become important considerations. Attempts have been made to minimize the size of high voltage DC power supplies by densely packing the components of the power supply. The result of this dense packing has been that the high voltage components have a tendency to arc across the small distances between the densely packed components, thereby compromising their operability and in some cases destroying such components. Encapsulating the entire power supply in a potting compound solved the arcing problem, but components of such an encapsulated power supply, if malfunctioning, cannot be accessed for repair, and the entire power supply must be discarded. Other efforts to minimize size and cost by reducing the total number of components have resulted in a sacrifice of performance.

OBJECTS OF THE INVENTION

An object of the present invention is to provide a compact DC power supply capable of delivering high voltage and high power density.

A further object of the present invention is to provide a low cost high voltage DC power supply that provides the performance features needed for high energy physics applications.

Another object of the present invention is to provide a high voltage power supply that is simple to build, maintain and repair.

Yet another object is to provide a power supply protected from destructive internal arcing.

A related object is to reduce the danger normally associated with high voltage power supplies of this type.

SUMMARY OF THE INVENTION

The present invention accomplishes the above and other objects through a unique modular packaging arrangement in which each power supply consists of a compact module that plugs into a system board which provides certain control components and functions common to as many as eight or more of such power supply modules. High component density is achieved and repairability is maintained by selectively encapsulating high voltage, high reliability components, while leaving low voltage, low reliability components unencapsulated for easy access and repair. The present invention further accomplishes the above objects through a power supply circuit that has a minimum number of components yet retains the performance features needed for high energy physics applications. The power supply of the present invention can be used in systems incorporating a large number of such supplies so that the output current of any one supply is low enough that the danger of harmful current is reduced.

DETAILED DESCRIPTION OF THE PREFERRED EMBODIMENT

Figure 1:
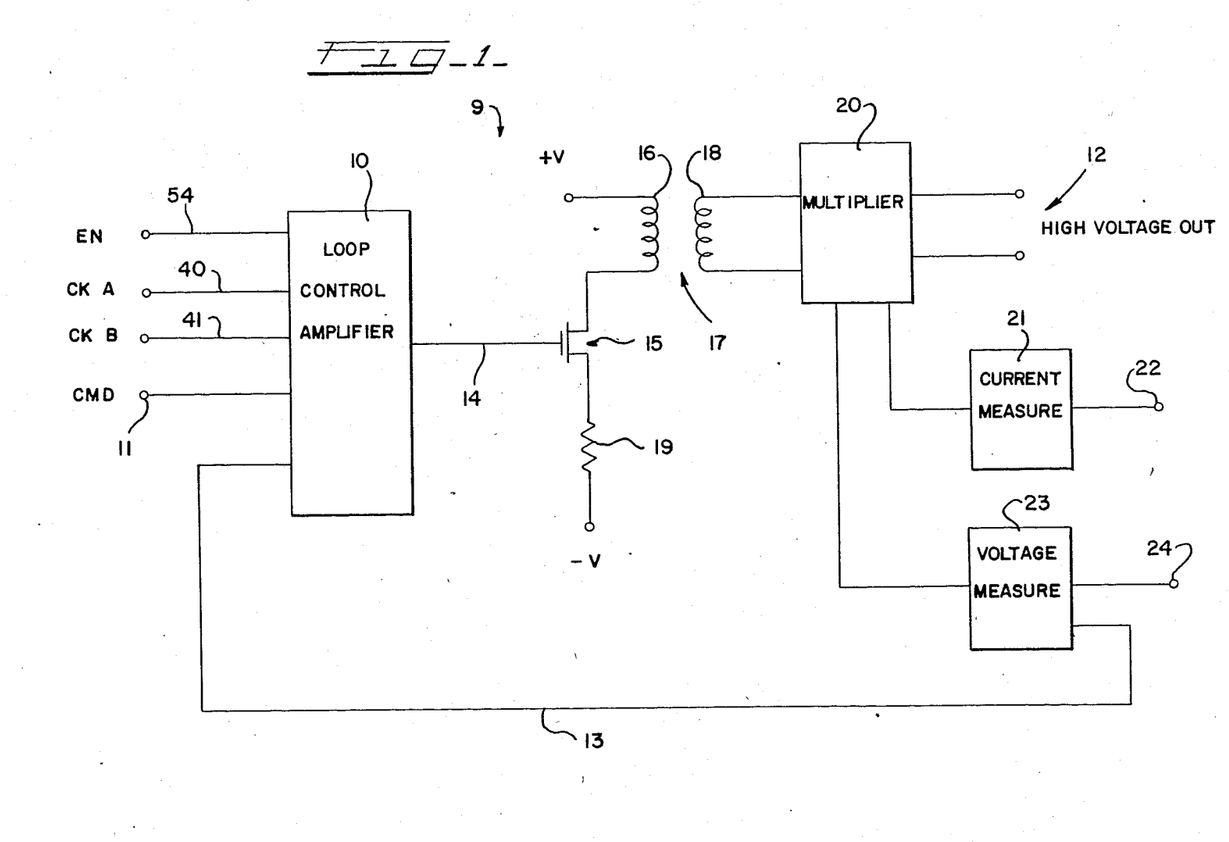
FIG. 1 is a diagram, partially schematic and partially block in form, generally illustrating the high voltage power supply of the present invention.

Referring now to the drawings, a power supply in accordance with the present invention is generally illustrated as power supply 9. A loop control amplifier 10 receives a command voltage 11 from an external source such as a computer (not shown) that controls a large number of supplies, or from a simple manually controlled voltage source dedicated to just one supply. The command voltage 11 is chosen to be proportional to the desired high voltage output 12 of the power supply 9. Command voltage 11 is compared to a feedback voltage 13 which is directly proportional to the actual voltage at high voltage output 12 and is at such a level as to be readily comparable to command voltage 11.

Loop control amplifier 10 generates pulse width controlled signal 14 which is coupled to a driver 15. Driver 15 may consist of a suitable field effect transistor, the gate of which would receive pulse width controlled signal 14. Voltage regulation is provided by varying the pulse width of pulse width controlled signal 14 in response to a difference between command voltage 11 and feedback voltage 13.

Driver 15 is arranged to control current through a primary coil 16 of a step-up transformer 17. Pulse width controlled signal 14 through driver 15 then controls the amount of time that current is flowing through primary coil 16 relative to the amount of time that such current is not flowing. In this manner, the voltage developed at a secondary coil 18 of transformer 17 can be controlled.

A resistive element 19 having a positive temperature coefficient is arranged to limit the current through primary coil 16. Resistive element 19 may be a varistor and serves as a current-responsive recoverable protection device.

The voltage developed at secondary coil 18 of step-up transformer 17 is applied to a multiplier 20. Multiplier 20 is of the conventional type, as discussed hereinafter, but is designed to be optimized in accordance with the objects of the present invention. Multiplier 20 rectifies and increases the voltage developed at secondary coil 18 to a high voltage level, and further filters out any time-varying component of such high voltage which is then made present at high voltage output 12.

A current measuring circuit 21 is disposed to measure the output current of power supply 9, as discussed more fully below. The measured current, shown at 22, may be used to evaluate the conditions in a multiwire proportional chamber or may be used to trigger a trip circuit (not shown) disposed to shut down the power supply if the output current exceeds acceptable levels such as would occur in the event of a spark or glow discharge. A trip circuit of this type could prevent chamber damage or human injury in the event of abnormal operating conditions. A voltage measuring circuit 23 is arranged to develop a measured voltage, shown at 24, responsive to and proportional to high voltage output 12. Voltage measuring circuit 23 further provides feedback voltage 13 to loop control amplifier 10.

Figure 2:
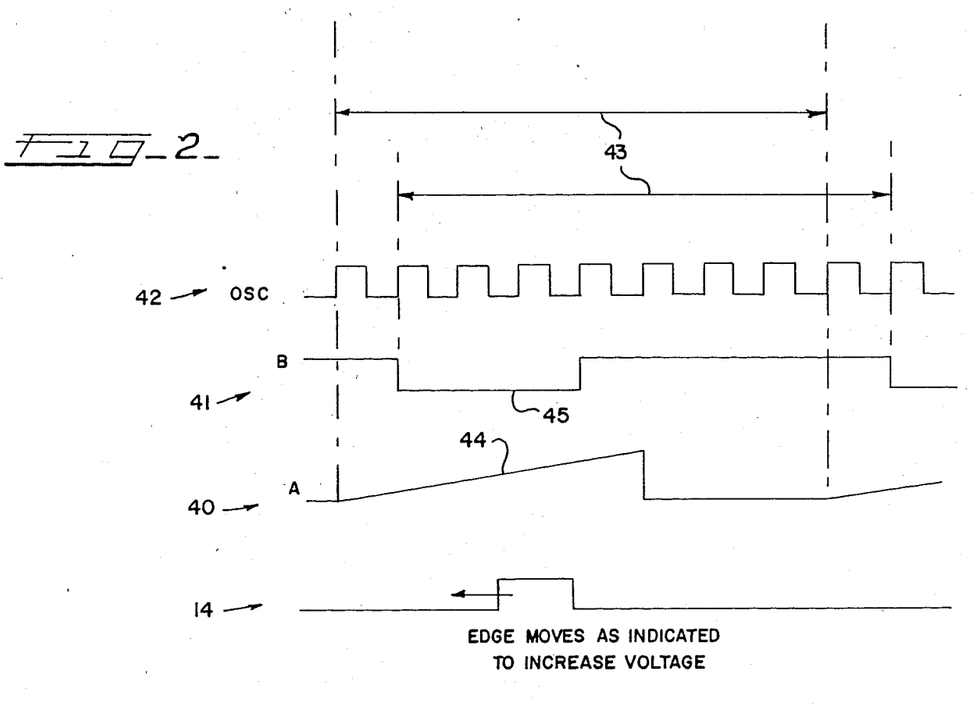
FIG. 2 is a timing diagram illustrating control signals of the preferred embodiment of the present invention.

To more fully understand the operation of that part of the power supply which comprises loop control amplifier 10, throughout the following discussion, reference should be made to FIG. 2 which is a timing diagram of clock signals used to generate pulse width controlled signal 14. Clock signal A, shown at 40, and clock signal B, shown at 41, are generated by a suitable circuit on a system board, shown generally at 200 in FIG. 6, that provides certain functions common to any number of individual power supplies which may be coupled to system board 200. Clock signals A and B are derived from an oscillator signal 42 with a frequency in the preferred embodiment of 1.6 MHz. As can be seen from FIG. 2, clock signals A and B each have a clock period 43 of 5 microseconds.

Figure 3A:
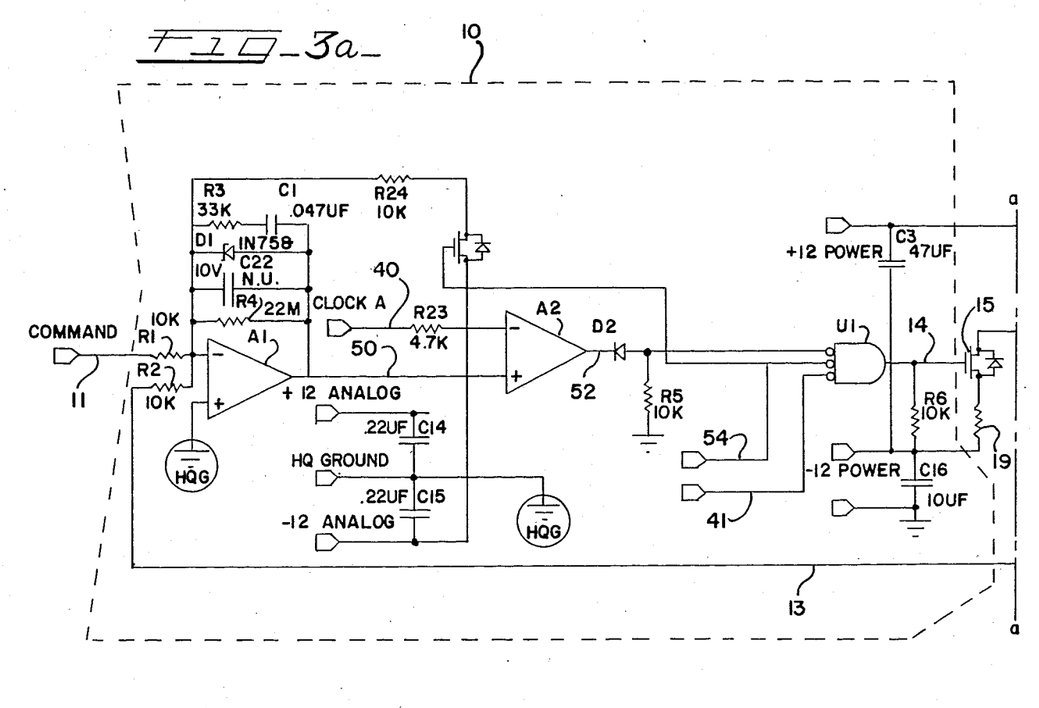
FIGS. 3a and 3b is a schematic diagram of the preferred power supply according to the present invention.
Figure 3B:
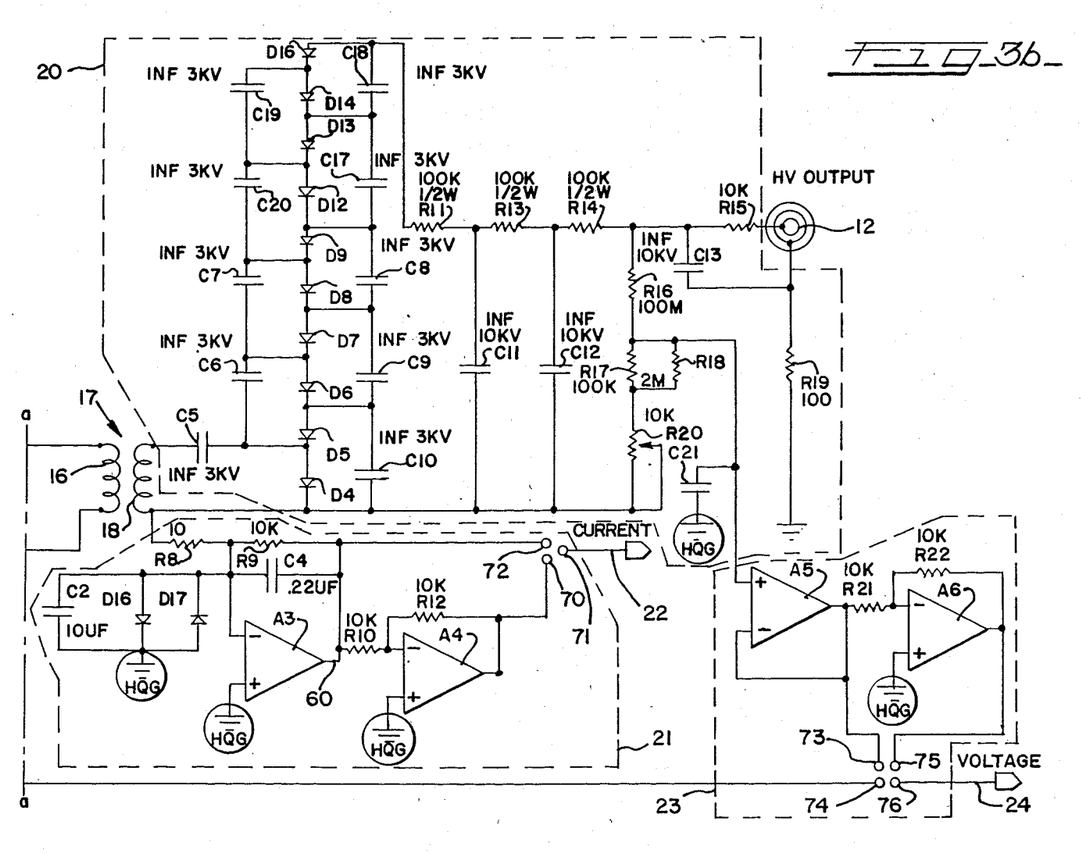

Referring now to FIGS. 3a and 3b, a schematic diagram of the preferred embodiment of the power supply of the present invention is provided. Amplifier A1 controls the regulation loop for the power supply. Command voltage 11, always positive, is scaled to be one volt in magnitude per kilovolt of desired high voltage output. Feedback voltage 13 is negative and per volt of magnitude represents one kilovolt of actual high voltage output 12. Through resistors R1 and R2, amplifier A1 senses the difference between command voltage 11 and feedback voltage 13. If a difference in magnitude between command voltage 11 and feedback voltage 13 is impressed upon amplifier A1, the output voltage of amplifier A1, shown at 50, will become more negative for a command voltage 11 larger in magnitude than that of feedback voltage 13 and will become more positive for a command voltage 11 smaller in magnitude than that of feedback voltage 13.

To more fully understand the operation of amplifier A1, consider by way of example a case in which high voltage output 12 is much lower than that which is commanded by command voltage 11. In such a case the magnitude of feedback voltage 13 would be small and that of command voltage 11 would predominate, yielding a positive voltage at the inverting input of amplifier A1. This would cause the output of amplifier A1 to move negative with large gain since feedback resistor R4 is large as compared to resistors R1 and R2.

The output of amplifier A1 is coupled to the non-inverting input of comparator A2. The inverting input of comparator A2 receives clock signal A, shown at 40 in FIG. 2. It will be seen that clock signal A can be described as a periodic ramp, shown at 44, increasing in voltage from approximately −12 volts to 0 volts. For that portion of the ramp during which clock signal A has a voltage level higher than that of the output of amplifier A1 the output of comparator A2, shown at 52, will be negative. Thus in the case of the example described above, the output of amplifier A1 may have a voltage level lower than that of clock signal A for all portions of the ramp 44 of clock signal A. In such a case, the output of comparator A2 would be negative for all times.

The output of comparator A2 is coupled to an inverting input of an AND gate U1. A second inverting input of AND gate U1 receives an active low clock signal B, shown at 41 in FIG. 2. A third inverting input of AND gate U1 receives an active low enable signal 54 which must be supplied by an external source in order for the power supply to generate high voltage. A trip circuit (not shown) referred to above may interrupt enable signal 54 in the event that a dangerous or destructive condition is detected, thereby disabling the power supply.

AND gate U1 generates pulse width controlled signal 14 in response to clock signal B and the output of comparator A2. The output of comparator A2 in turn is determined by clock signal A and the output of amplifier A1. Further, the output of amplifier A1 is determined by the difference between command voltage 11 and feedback voltage 13. Thus, in the case of the example referred to above, where the output of comparator A2 is negative for all times, pulse width controlled signal 14 has a large maximum pulse width defined by the active portion of clock signal B, shown at 45 in FIG. 2. This maximum pulse is of an amount such that with a given operating frequency, step-up transformer 17 core material and number of winding turns of primary coil 16, the core of step-up transformer 17 will be just short of saturating. The example referred to above represents a case in which high voltage output 12 is much lower than that which is commanded by command voltage 11. In such a case, pulse width controlled signal 14 has a large pulse width thereby causing driver 15 to allow current to flow through primary coil 16 for a large portion of time during each clock period 43 of clock signals A and B.

By way of further example consider a second case in which high voltage output 12 is much higher than that which is commanded by command voltage 11. In such a case, the magnitude of feedback voltage 13 would be large and that of command voltage 11 would be small, yielding a negative voltage at the inverting input of amplifier A1. This would cause the output of amplifier A1 to move positive with large gain. In this case, the output of amplifier A1 may have a voltage level higher than that of clock signal A for all portions of the ramp 44 of clock signal A, thereby causing the output of comparator A2 to be positive for all times. This in turn would cause the output of AND gate U1 to be negative for all times. In this case, the pulse width of pulse width controlled signal 14 would be zero, thereby causing driver 15 to discontinue all current through primary coil 16.

Consideration of a third case less extreme and in between the first two will enable an appreciation of the more common situation in which the servo loop of the power supply is close to balancing command voltage 11 and feedback voltage 13, thereby allowing an understanding of the dynamics of loop control amplifier 10 in operation. In this third case, the output of amplifier A1 would be more positive than clock signal A during a part of ramp 44 and more negative during the remainder of ramp 44. During that portion of ramp 44 that the output of amplifier A1 is more negative than clock signal A the output of comparator A2 will be negative. Assuming that the power supply is enabled via a low level enable signal 54, it is during the portion of each clock period 43 that both the output of comparator A2 and clock signal B are negative that the output of AND gate U1, comprising the pulse width controlled signal 14, is positive. In other words, the pulse width of pulse width controlled signal 14 is controlled by the output of comparator A2 and clock signal B. It should be noted that if the output of amplifier A1 is more negative than clock signal A for any part of clock period 43, the output of comparator A2 will always be negative at the end of ramp 44. Since ramp 44 ends after the end of the active portion of clock signal B, shown a 45, the end of a pulse, if there is one, of pulse width controlled signal 14, then coincides with the end of the active portion 45 of clock signal B. In this way, the negative-going output of comparator A2 controls the leading edge of a pulse and the positive-going end of the active portion 45 of clock signal B controls the trailing edge of such pulse. As can be seen from FIG. 2, the beginning of a pulse of pulse width controlled signal 14 smoothly moves earlier in time if, in magnitude, command voltage 11 exceeds feedback voltage 13, and later in time if, in magnitude, feedback voltage 13 exceeds command voltage 11. The maximum pulse width limit is the width of the active portion 45 of clock signal B and it occurs when the output of comparator A2 is negative during the entire active portion 45 of clock signal B. The minimum pulse width is no pulse at all, and it occurs when the output of comparator A2 is positive during the entire active portion 45 of clock signal B.

As was mentioned above, pulse width controlled signal 14, controls driver 15. The preferred driver 15 is a VMOS power transistor and may be a commercially available IRF530. Driver 15 is disposed to allow current to flow through primary coil 16 during each pulse of pulse width controlled signal 14. A longer pulse allows current to flow through primary coil 16 for a longer relative period, which in turn increases the voltage at high voltage output 12. Resistive element 19, having a positive temperature coefficient, serves as a recoverable protection device limiting the current through primary coil 16. As more current flows through primary coil 16, more power is dissipated by resistive element 19. As more power is dissipated, the temperature of resistive element 19 increases. Due to its positive temperature coefficient, as its temperature increases, its resistance increases as well, thereby further limiting the current through primary coil 16. The preferred resistive element 19 limits current through primary coil 16 to a maximum of approximately two amperes.

As current through primary coil 16 is switched on and off by driver 15 in response t pulse width controlled signal 14, step-up transformer 17 causes a high voltage to be developed at its secondary coil 18. Step-up transformer 17 has a turns ratio of 40, with primary coil 16 having 5 turns and secondary coil 18 having 200 turns. The preferred step-up transformer 17 may be fabricated by winding 5 primary turns and 200 secondary turns on a transformer core which may be a commercially available H7C43726Z. Secondary coil 18 is coupled in the usual manner to multiplier 20, having a network of diodes, D4 through D9 and D12 through D15, and capacitors C5 through C10 and C17 through C20. Multiplier 20 rectifies and increases the voltage present at secondary coil 18. As shown in FIGS. 3a and 3b, multiplier 20 is configured so that the power supply creates a high voltage of negative polarity. By reversing the diodes of multiplier 20 the power supply can readily be made to create a high voltage of positive polarity. Resistors R11, R13 and R14 and capacitors C11 and C12 comprises a filter for removing any time-varying component of the high voltage from multiplier 20.

The power supply of the present invention has a current measuring circuit 21 for the purposes discussed above. When the power supply provides output current through high voltage output 12, the current path is through resistors R15, R14, R13 and R11, the multiplier 20 and resistor R8. Amplifier A3 provides a virtual ground at its summing junction. In actuality, the ground current source or sink is the output of amplifier A3, shown at 60, through resistor R9. Thus, the voltage drop across resistor R9 is used to measure the output current of amplifier A3 and, indirectly, the output current of the power supply. In the preferred embodiment, as shown in FIGS. 3a and 3b, a measured current value, shown at 22, is one volt per 100 microamperes of output current.

The power supply is also provided with a voltage measuring circuit 23 that, in addition to providing an indication of output voltage, at 24, supplies feedback voltage 13 for loop control amplifier 10. A voltage divider network consisting of resistors R16, R17, R18 and R20 provides the source for voltage measurement and the feedback voltage 13. The voltage divider of the preferred power supply provides one volt of voltage measurement and feedback per kilovolt of output. Amplifiers A5 and A6 are used to buffer the measured voltage and to ensure that feedback voltage 13 is negative regardless of the polarity of high voltage output 12.

Resistor R15 in series with high voltage output 12 is necessary to protect the components of the power supply from sudden high voltage that would develop within the power supply due to a short circuit of high voltage output 12, due to a spark for example. Since resistor R15 is after the voltage divider, it is outside the regulation loop and thus would ordinarily cause a loss of regulation due to the variable voltage that would develop across resistor R15 depending upon the output current of the power supply. The power supply of the present invention solves this problem by having the high voltage side of the supply float above ground by the amount of voltage across resistor R8. Since the same current which flows through resistor R15 also flows through resistor R8, resistor R8 is made smaller than resistor R15 by the same proportion that feedback voltage 13 is smaller than high voltage output 12, namely by a factor of 1000 in the preferred embodiment. The result is that the voltage drop across resistor R8 modifies feedback voltage 13 by an amount needed to compensate the power supply output voltage for the voltage drop across resistor R15. It is of great advantage that the current through the voltage divider is not passed through current measuring circuit 21. Thus, current measuring circuit 21 can be made sensitive enough to measure output currents much smaller than the current through the voltage divider.

In keeping with the objects of the invention, the power supply is designed so as to be able to be made as a low-cost standard module. Only minor construction differences exist between positive and negative output polarity modules, further lowering cost of manufacture while enhancing versatility. As noted above, the orientation of multiplier diodes D4 through D9 and D12 through D15 as shown in FIGS. 3a and 3b will produce a negative output voltage. Simply installing such diodes in reverse orientation will create a power supply of positive voltage output. In addition, the location of three jumper wires will configure current measuring circuit 21 and voltage measuring circuit 23 for the particular polarity selected, as well as insure that feedback voltage 13 is of negative polarity as it must be for proper operation of loop control amplifier 10. With reference to FIGS. 3a and 3b negative polarity module will have jumper wires between terminals 70 and 71, 73 and 74, and 75 and 76. A positive polarity module, on the other hand, will have jumper wires between terminal 72 and 71, 73 and 76, and 75 and 74. In this way, for either polarity module, the measured current 22 and measured voltage 24 will be positive and feedback voltage 13 will be negative.

The above description of the preferred power supply, in conjunction with FIGS. 3a and 3b, was deemed necessary in keeping with the objects of the present invention. The power supply described above is one that has a wide current range, a high efficiency, low stored energy, high stability over a wide range of output voltage and current, and yet is simple to build and can be manufactured at a very low cost.

Pursuant to the invention, the power supply as described above can be assembled on a single printed circuit board and can be made to have very compact dimensions as to be described. High component density without the tendency to cause arcing is achieved by encapsulating high voltage components. In general, simple high voltage components are more reliable than sophisticated integrated circuits. Thus, encapsulating the high voltage components does not significantly lessen repairability of the power supply. Less reliable circuit elements, which in any event are not subject to high voltage and arcing, remain unencapsulated in order to facilitate repair, when necessary. By selectively encapsulating only high voltage circuit elements in the manner described, both high component density and ease of repair can be achieved.

Figures 4, 5, 6:
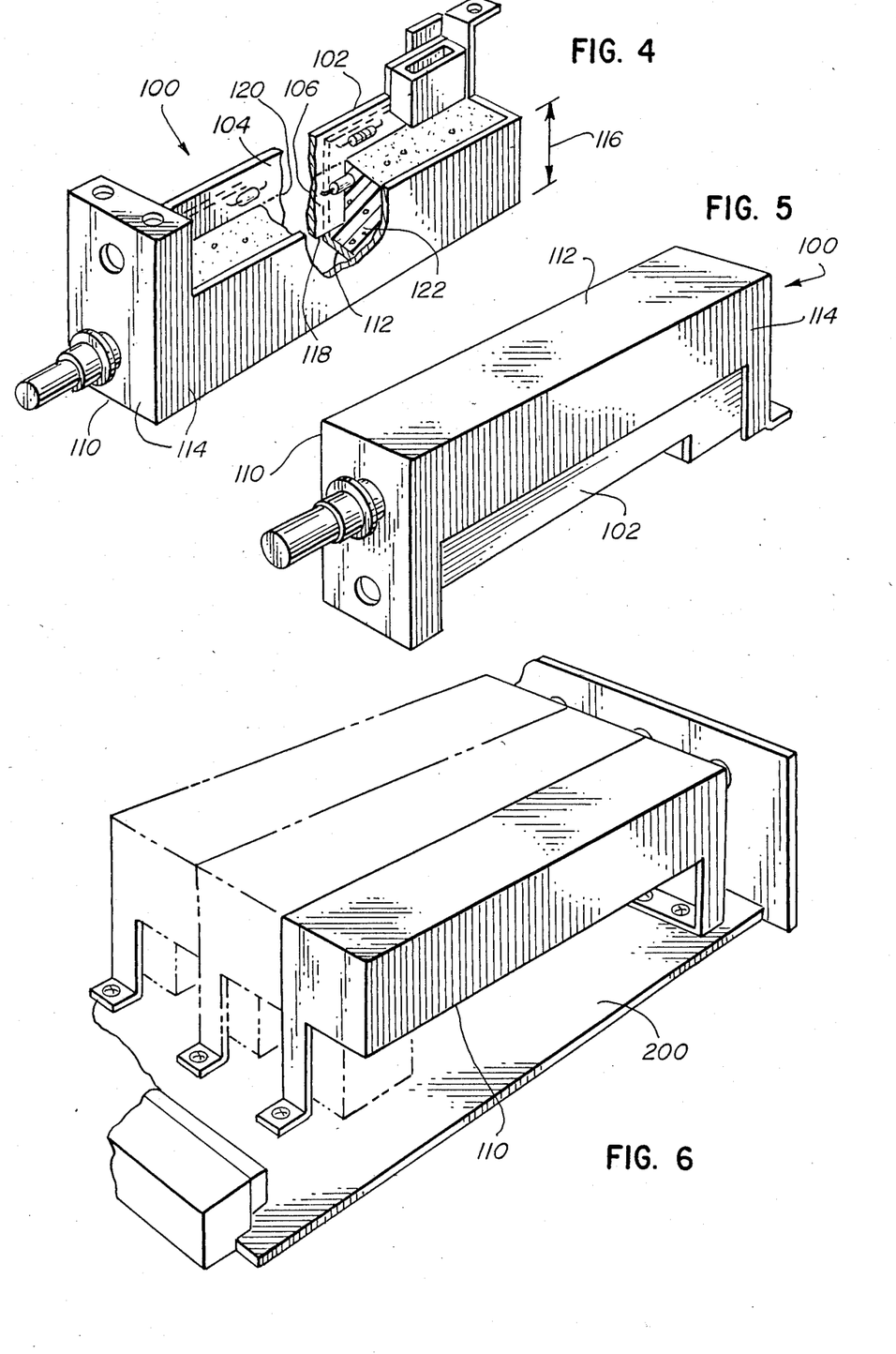
FIG. 4 is a cutaway perspective view revealing the construction of a power supply module of the present invention.
FIG. 5 is a perspective of an assembled power supply module.
FIG. 6 illustrates the incorporation of a number of modules onto a common system board.

With reference to FIGS. 4 and 5, a power supply module 100 of the present invention is constructed with a single printed circuit board 102. The circuit board 102 is divided into two regions. A first region 104 is mounted with low voltage, low reliability circuit elements such as integrated circuits, and a second region 106 is mounted with high voltage, high reliability circuit elements such as step-up transformer 17 and the components which form the multiplier 20.

The circuit board 102 is mounted in a container 110 which houses the second region 106. Container 110 may be fabricated from any suitable material such as sheet metal. Container 110 has a bottom 112 and walls 114 extending from the bottom 112. The walls 114 have a minimum height dimension 116 with respect to the bottom 112. Edge 118 of circuit board 102 is disposed in proximate abutment with the bottom 112 such that parallel to edge 118 and at a distance from edge 118 equal to height dimension 116 is a border 120 separating first region 104 and second region 106. In this manner, second region 106 of circuit board 102 has a width dimension defined by border 120 and edge 118 which is equal to height dimension 116.

With the second region 106 extending inside container 110 and the first region 104 extending outside container 110 as described, a suitable substance for encapsulating the second region 106 and the high voltage circuit elements mounted thereon may be placed within the container 110. In the preferred embodiment, an epoxy resin or other normally solid dielectric insulating compound, shown at 122, is used to fill container 110 to a level sufficient to encapsulate the second region 106 and the high voltage circuit elements mounted thereon. In the preferred module, step-up transformer 17 and the components of multiplier 20 are encapsulated, and the components of loop control amplifier 10, voltage measuring circuit 23 and current measuring circuit 21, as well as driver 15 and resistive element 19 remain unencapsulated.

Inasmuch as the first region 104 which is mounted with unencapsulated components extends outside the container 110, not only are such components unencapsulated, but the walls 114 of container 110 do not cover such components or otherwise hinder access to them should repair or replacement of them be necessary.

In keeping with the objects, the present invention provides a compact, low cost, high voltage modular power supply. As many as eight of such modules can be incorporated into a standard VME-type crate using a single system board, as shown in FIG. 6 and described above. The modules can be easily made with positive or negative polarity outputs, and any mix of polarities is possible on a single system board. The modules can be densely packed in order to reduce overall size. In addition, subcircuits that perform common functions such as the generation of clock signals are located on the system board instead of redundantly being located in each module, thereby further reducing overall size and cost.

The foregoing description of the invention has been presented for purposes of illustration and description. It is not intended limit the invention to the precise forms disclosed, and obviously many modifications and variations are possible in light of the above teachings.

What is claimed is:

1. A DC power supply having a high voltage output comprising:
 loop control amplifier means for developing a pulse width controlled signal in response to a magnitude difference between a command voltage and a feedback voltage derived from said high voltage output;
 driver means for controlling current through a primary coil of a step-up transformer, said driver means responsive to said pulse width controlled signal;
 multiplier means for rectifying and increasing voltage present at a secondary coil of said step-up transformer;
 voltage divider means coupled to said multiplier means for sensing the voltage produced by said multiplier means and for providing said feedback voltage;

current limiting resistor means in series with said high voltage output for protecting components of said power supply from damage in the event of a short circuit of said high voltage output;

current sensing resistor means in series with said high voltage output for developing a voltage representing current magnitude flowing through said high voltage output, said current sensing resistor means coupled to said voltage divider means so that said voltage representing current magnitude modifies said feedback voltage to compensate for a voltage drop across said current limiting resistor means so as to maintain voltage regulation of said high voltage output;

current measuring means responsive to said voltage representing current magnitude for providing a signal representing current magnitude for providing a signal representing current magnitude flowing through said high voltage output; and voltage measuring means responsive to said feedback voltage for providing a signal representing a voltage magnitude present at said high voltage output.

2. The high voltage DC power supply of claim 1 wherein said driver means comprises a VMOS field effect transistor.

3. The high voltage DC power supply of claim 1 further comprising resistive element means for resisting the current through said primary coil, said resistive element means having a positive temperature coefficient.

4. The high voltage DC power supply of claim 3 wherein said resistive element means comprises a varistor.

5. The high voltage DC power supply of claim 1 wherein said pulse width controlled signal is variable down to a pulse width of zero.

6. The high voltage DC power supply of claim 1 wherein said loop control amplifier means comprises:

amplifier means for creating a first signal having a voltage representing said magnitude difference;

comparator means for creating a second signal if said first signal is of greater voltage than a first clock signal voltage, said first clock signal voltage being a periodic ramp; and gate means for generating said pulse width controlled signal having a pulse with a leading edge controlled by said second signal and a trailing edge controlled by a second clock signal.

7. The high voltage DC power supply of claim 1 wherein said feedback voltage is proportional to the voltage at said high voltage output, and the ratio of the resistance value of the current sensing resistor means to the resistance value of said current limiting resistor means equals the ratio of the feedback voltage to the voltage at said high voltage output.

* * * * *